April 8, 1952 R. T. KIMMEL ET AL 2,592,429
TARGET WITH ELECTRICAL INDICATING SYSTEM
Filed Dec. 18, 1948 4 Sheets-Sheet 1

Inventors
RAYMOND T. KIMMEL &
JAMES A. WOODSON
By Emery, Holcombe & Blair
ATTORNEYS April 8, 1952 R. T. KIMMEL ET AL 2,592,429
TARGET WITH ELECTRICAL INDICATING SYSTEM
Filed Dec. 18, 1948 4 Sheets-Sheet 2

Inventors
RAYMOND T. KIMMEL &
JAMES A. WOODSON

By Emery, Holcombe & Blair
ATTORNEYS

April 8, 1952    R. T. KIMMEL ET AL    2,592,429
TARGET WITH ELECTRICAL INDICATING SYSTEM
Filed Dec. 18, 1948    4 Sheets-Sheet 3

Inventors
RAYMOND T. KIMMEL &
JAMES A. WOODSON

By Emery Holcombe & Blair

ATTORNEYS

April 8, 1952 R. T. KIMMEL ET AL 2,592,429
TARGET WITH ELECTRICAL INDICATING SYSTEM
Filed Dec. 18, 1948 4 Sheets-Sheet 4

Inventors
RAYMOND T. KIMMEL &
JAMES A. WOODSON
By Emery, Holcombe & Blair
ATTORNEYS Patented Apr. 8, 1952

2,592,429

UNITED STATES PATENT OFFICE 2,592,429

TARGET WITH ELECTRICAL INDICATING SYSTEM

Raymond T. Kimmel and James A. Woodson, Hutchinson, Kans.

Application December 18, 1948, Serial No. 66,064

3 Claims. (Cl. 273—102.2)

This invention relates to electrically wired targets which are designed to transmit to a registering device electrical impulses indicating the number of "hits" and the scoring ring in which each bullet struck. The registering device will usually be located near the firing position, and thus enable the marksmen to determine their score without having to go to the other end of the range and examine the target. Targets of this general type are well known; but my invention possesses certain advantages in durability, reliability, simplicity, and portability not hitherto known in the art. It is a further feature of our invention that bullets striking along the line between two rings will cause only one impulse to be transmitted to the recording device, and this impulse will indicate a hit in the higher scoring ring, in accordance with the customary scoring practice among marksmen.

Additional objects and advantages will in part appear and in part be pointed out in the course of the following description of one embodiment of the invention, which is given as a non-limiting example.

Figure 10:
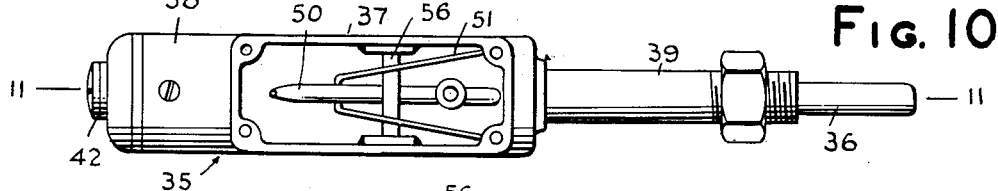
Figure 10 is a top view of the switch with its cover plate removed.
Figure 11:
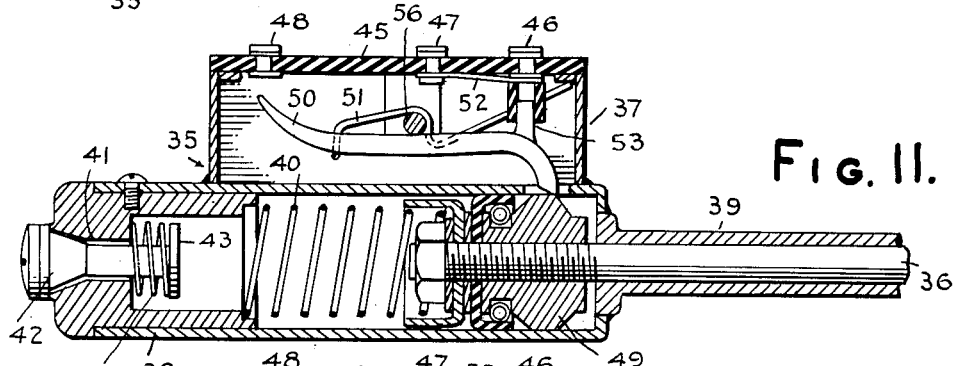
Figure 12:
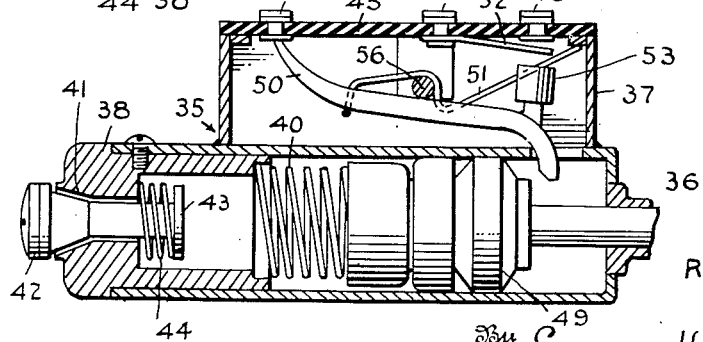

Figure 11 is a cross-sectional view of the switch drawn to a larger scale taken along the line 11—11 of Figure 10, with the contacts in the usual position; and Figure 12 shows a cross-sectional view of the switch with the moving elements in elevation taken along the line 11—11 of Figure 10, with the contacts in the position assumed immediately after the ring with which it is connected has been struck by a bullet.

Figure 4:
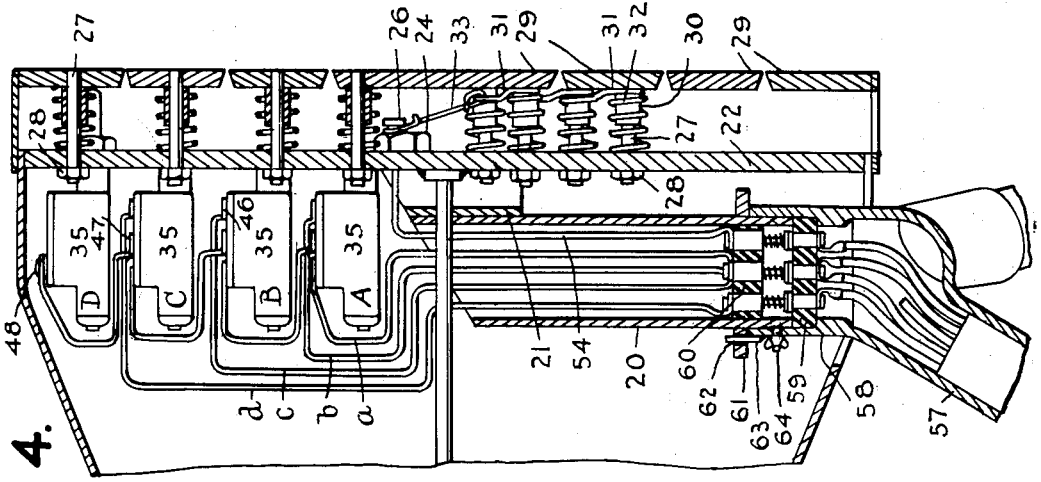
Figure 4 is a cross-section taken along the line 4—4 of Figure 1.
Figure 5:
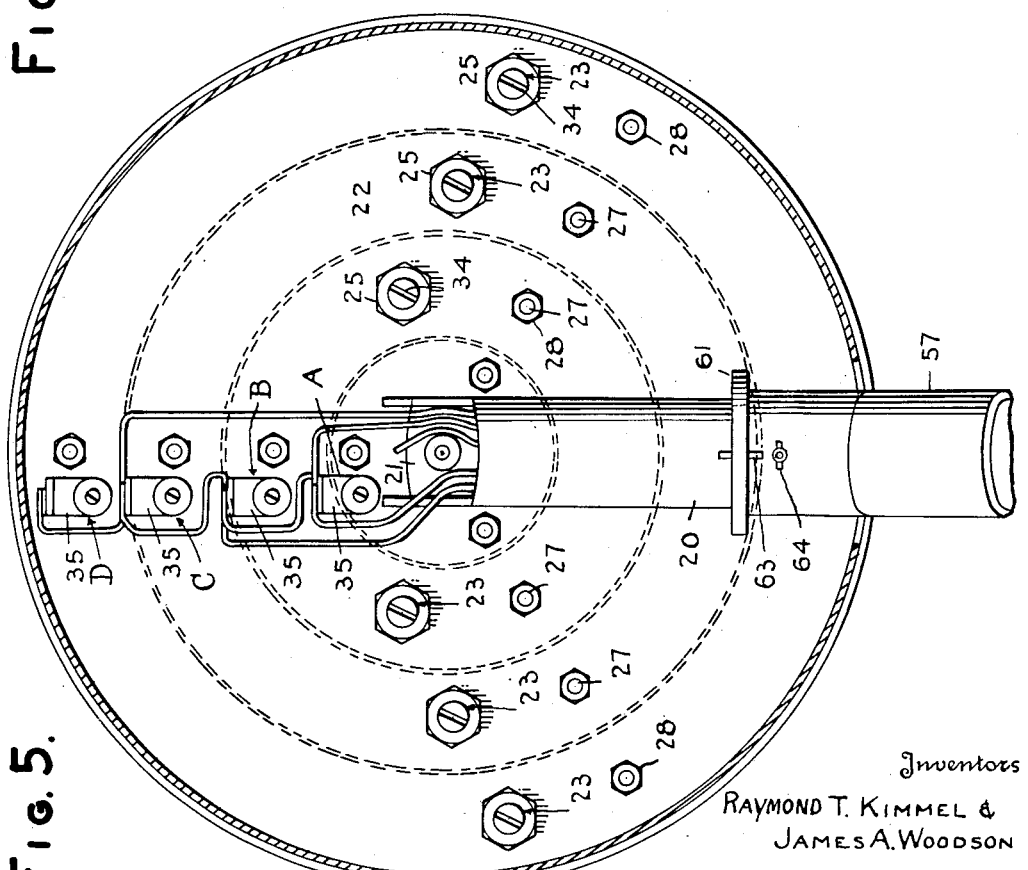
Figure 5 is rear view of the target as shown in Figure 4, with the cover removed.
Figure 6:
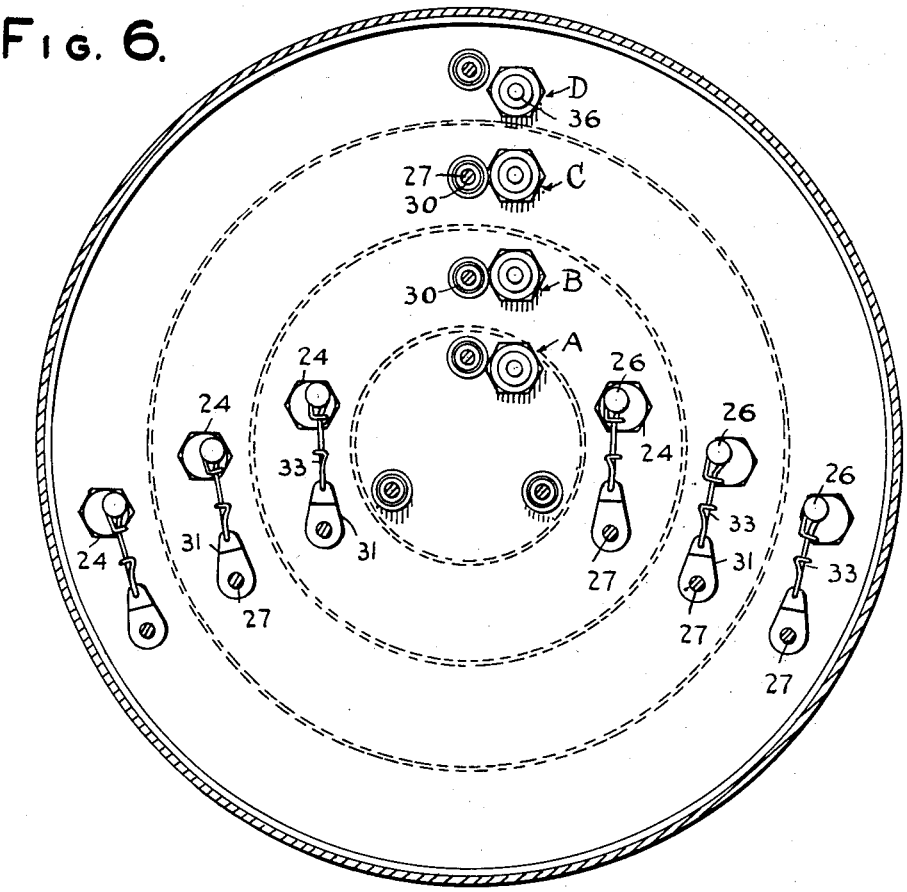
Figure 6 is a front view of the supporting plate.
Figure 7:
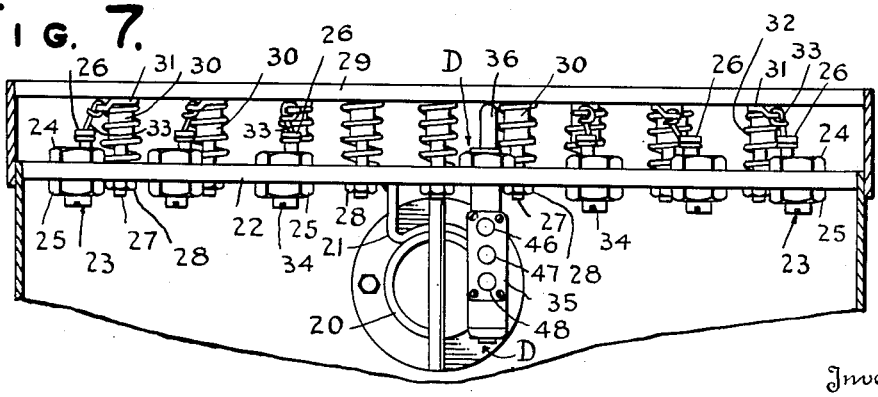
Figure 7 is a plan view with the case in section.
Figure 8:
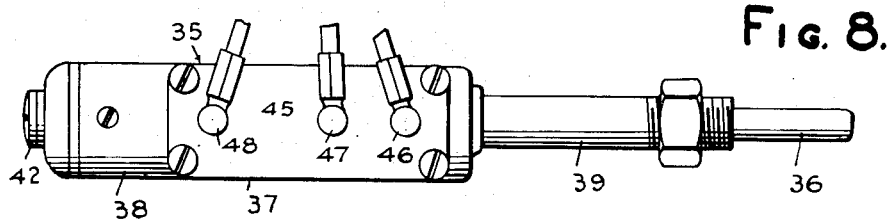
Figure 8 is a top view and Figure 9 a side view of the impact receiving switch.
Figure 9:
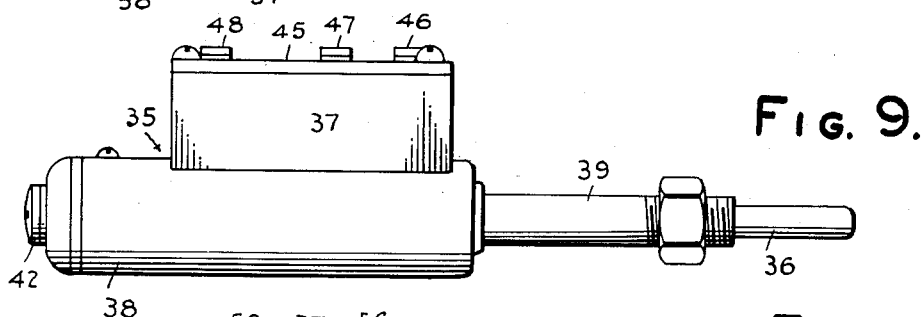

Referring to Figures 4 and 5 of the drawings a vertical pipe 20 carries a forwardly projecting flange 21, to which is bolted or welded a metal disk or "backing plate" 22. This backing plate is pierced by one or more radial and equidistant rows of heavy bolts 23, with large forwardly projecting heads 24, and capped by nuts 25 at the rear of the backing plate. On each bolt-head 24 is a forwardly projecting, eccentrically positioned lug 26. Below each bolt 23 lies a stud 27 adapted to reciprocate horizontally through an aperture in the backing plate 22. Forward motion of this stud is limited by a nut 28 on its rear end, and its forward end is attached to a target ring 29, spaced from the backing plate. For a portion of the distance between said backing plate and target ring the stud 27 is surrounded by a tube 30 carrying near its forward end a lug 31, and both stud and tube are surrounded by a coil spring 32 which serves to cushion the rearward movement of the target ring when it is struck, and return it to normal position after the impact is recorded. A link 33 depends from the eccentrically positioned lug 26 on the bolt head 24, is attached to the lug 31 on stud 27, and serves as a support for the stud and target ring assembly. It will be appreciated that since this lug is eccentrically located with respect to the horizontal axis of the bolt, any turning of the bolt will affect the height of the lug, and consequently that of the target ring dependent therefrom. Small adjustments in the positioning of the rings may accordingly be made in this manner after the target has been assembled, and the rearwardly projecting tip of the bolt 23 has been provided with a slot 34 in order that a screw driver may be used for this purpose. It will be appreciated that there may be as many concentrically disposed target rings 29 as desired, each supported by as many bolt and stud combinations of the type outlined above as may be necessary. Extremely light targets may be carried by the studs alone, without support bolts. Impact switches 35 are mounted on the rear of the backing plate 22, with their impact receiving rods 36 projecting forward through apertures in said backing plate. At least one of these switches is mounted behind each of the concentric target rings; for large targets there may be several switches suitably spaced behind each ring.

Each switch 35 comprises a casing 37 within the lower cylindrical portion 38 of which the impact receiving rod 36 is adapted to reciprocate. This cylindrical portion 38 of the casing carries at its forward end a guiding tube 39 through which the rod 36 is admitted to the casing. The rod 36 carries near its inner end a flexible sealing member 65, which may be of rubber, and is biased outwardly against the casing wall by a resilient ring 66. To the inner end of the rod 36 is attached one end of a coil spring 40, the opposite end of which is seated against an abutment near but spaced from the rear end of the casing. This rear end of the casing is pierced by an aperture 41, normally closed by a valve plug 42. This valve plug extends within the casing 37 and terminates in a flange 43. A small coil spring 44 surrounds the plug between the casing wall and the flange, thus serving to retain the valve in a normally closed position. The upper portion of the casing 37 comprises a substantially rectilinear chamber, the upper side 45 of which is formed of insulating material. This insulating side is pierced by three electrical terminals 46, 47 and 48. These three terminals form a straight line along the longitudinal axis of the insulating plate, with contact 46 nearest the rod receiving end of the casing, and contact 48 nearest the valve end. The rod 36 carries a shoulder 49 between the spring 40 and the front wall of the lower casing. A generally S-shaped conductor 50 is pivoted about a horizontal axis 56 located near the center of the rectilinear chamber, and is biased by a wire spring 51 which tends to force one of its ends down against the shoulder 49 on the rod 36, and the other upward against the terminal 48. The conductor 50 is so constructed and positioned that one end cannot reach the contact member 48 as long as its other end rests against the shoulder 49. However, when the rod is pushed inward, the shoulder 49 slides past the end of the conductor 50, which is then free to pivot sufficiently further to make contact with terminal 48. A leaf spring type conductor 52 runs from contact 47 to a position between contact 46 and an insulated protuberance 53 on conductor 50 which lies immediately below the contact 46. This leaf spring conductor presses downward against the protuberance 53 rather than upward against the contact 46. The conductor 50 is so disposed that when the shoulder 49 is in normal position, the protuberance 53 is pressed upward to hold the leaf spring conductor 52 against the contact 46. However, when this shoulder is moved rearwardly, by reason of an impact received by the rod, the wire spring 51 will force the end of the conductor 50 carrying the protuberance 53 downward, away from the contact 46, and the leaf spring conductor 52 will follow it. At the same time, the opposite end of the conductor will rise to meet contact 48. It will thus be seen that while the shoulder 49 is in normal position a current may pass from 47 to 46 through the leaf spring member, but when the shoulder is removed, this contact will be broken.

Figure 1:
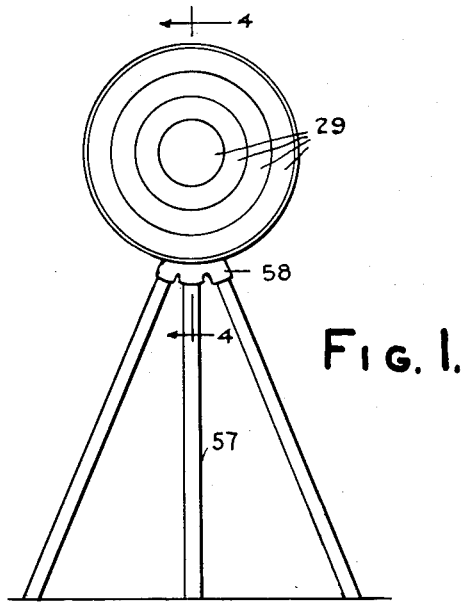
Figure 1 is a front view, and Figure 2 a side view showing the exterior of my new target.
Figure 2:
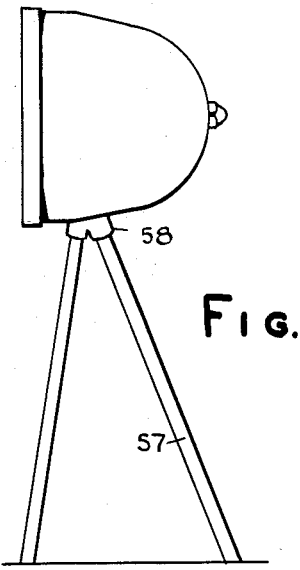
Figure 3:
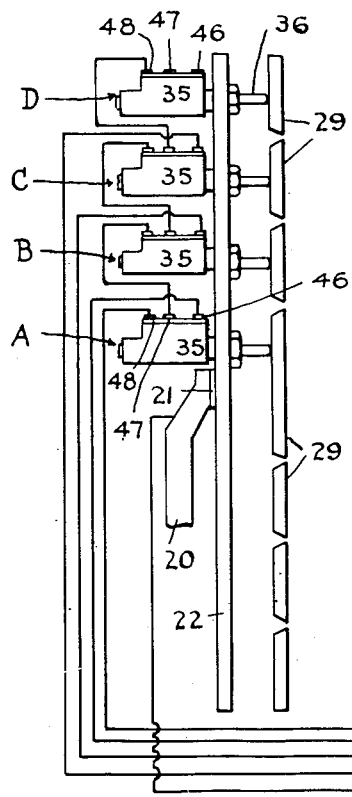
Figure 3 is a diagram showing the electrical wiring involved.
Figure 3:
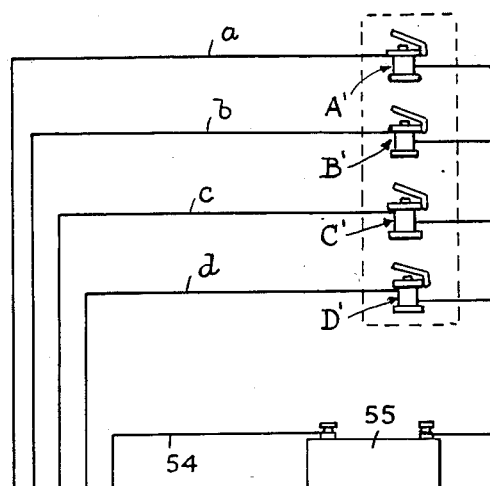

Referring now particularly to Figure 3, it will be seen that ground wire 54 leads from one terminal of battery 55 to the supporting pipe 20, and the entire target assembly is thus used as a general ground. Reference characters A, B, C and D indicate impact switches, each controlling a different target ring, and A', B', C', and D' indicate the corresponding solenoids of a registering device controlled by the several switches. These solenoids are connected in parallel with the remaining terminal of the battery 55, and wire "a" leads from solenoid A' to terminal 48 of switch A. Wire "b" leads from solenoid B' to terminal 46 of switch A, wire "c" from solenoid C' to terminal 46 of switch B, and wire "d" from solenoid D' to terminal 46 of switch C. Terminal 47 of A is then connected to 48 of B, 47 of B to 48 of C and 47 of C to 48 of D.

The operation of the target is now readily apparent. When a bullet strikes the outer target ring for instance, this ring will be driven back against the pressure of coil spring 32, and drive the impact receiving rod 36, into its casing 37. This will force back the shoulder 49 supporting the front end of the pivoted conductor 50, and permit its rearward end to make contact with terminal D48. Since the pivot of the conductor member is grounded, and for the sake of convenience the direction of current flow will be considered as from ground, current will now flow in through the pivot, over the pivoted conductor, through contact D48 down to contact C47. From C47 it will flow through the leaf spring C52 to contact C46, and out through wire "d" to actuate solenoid D'. However, if the bullet should strike both target ring D and C, by hitting on the line between them, both the impact rod associated with switch D and that associated with switch C will be actuated. Furthermore the contact between terminal 46 and the leaf spring will be broken before that between the conductor and terminal 48 of each switch is established. Consequently, the circuit from the pivot of D through D48, and C47 to C46 and solenoid D' will be interrupted by the breaking of the contact between C47 and C46 before any current can flow. However, current will now pass from the pivot of switch C, through C48, B47, and B46 over wire "c" to solenoid C', which will actuate the registering device to record a hit on the C ring. This is in accordance with the usual scoring custom with respect to shots placed on the line separating two rings. It will be noted that no current flows except at the instant a shot is being recorded, so that the target is very economical to operate. Of course, any suitable source of power may be substituted for the battery shown. The solenoids are merely illustrative of one method of actuating a recording device. Our target may be used with any suitable recording device which operates in response to electrical impulses.

For convenience and portability we mount our supporting pipe 20 on a tripod, having a hollow joint 58 and at least one hollow leg 57. The wires are then led up the leg 57 and terminate in individual contacts at the top of the hollow coupling 58, held spaced from the coupling 58 and each other by a suitable insulating block 59. Corresponding wires lead up the supporting pipe 20 to the appropriate terminals, and their lower ends are also connected at the lower end of the pipe 20, to contacts held in a suitable insulator 60. The supporting pipe fits neatly within the coupling and is surrounded by a flange 61, which prevents it from sinking into the coupling any further than is necessary for the two sets of contacts to meet. A hole 62 in the flange is adapted to register with a lug 63 on the joint when the proper contacts are registering with each other. A wing screw 64 near the lug 63 on the coupling 62 bears against the inserted portion of the supporting pipe 20 to insure a firm connection.

What we claim is:

1. A target for use in association with an electric power source one terminal of which is connected to a recording device having a plurality of electrical paths, comprising a series of separate concentric rings, a backing plate on which each ring is separately mounted for limited reciprocal movement relative thereto, a switch including a casing supporting three insulated electrical terminals, a spring conductor within said casing running from one terminal to a point near but spaced from a second terminal, a pivoted conductor for controlling the operation of said switch, said pivoted conductor holding said spring conductor in contact with said second terminal when swung in one direction and itself maintaining contact with the third terminal when swung in the other direction, a movable rod provided with a shoulder and so positioned as to hold said pivoted conductor against said spring conductor and the latter in contact with said second terminal, and spring means engaging said pivoted conductor for biasing it toward contact with said third terminal, said switch being mounted on the backing plate behind each target ring with its movable rod projecting sufficiently forward to be struck by said target ring when it is forced backward, an electrical path leading to said pivoted conductor and adapted for connection to the opposite terminal of said power source, additional conductors leading from the separate electrical paths within said recording device to said second terminals of all but the outermost switch, an additional conductor leading from a separate electrical path within the recording device to the third terminal of the innermost switch, and conductors connecting the first terminal of all except the outermost switch with the third terminal of the switch corresponding to the outermost adjacent ring.

2. A target for use in connection with an electric recording device comprising a support, a group of concentric rings mounted on said support for individual axial movement, at least one individual control member for each ring so mounted on said support behind its respective ring as to be moved by rearward movement of said ring, a separate switch for each control member, said switch comprising three insulated electrical terminals mounted on said support, a spring conductor running from one terminal to a point near but spaced from a second terminal, and a pivoted conductor having one insulated tip and so positioned that when swung into first position this tip will hold the spring conductor against the second terminal and when swung in the other direction the opposite end of the pivoted conductor will make contact with the third terminal and the insulated tip will swing away from the second terminal, thus permitting the spring conductor to move away from said second terminal, each said control member having a normal position relative to the pivoted conductor of its respective switch in which it holds said pivoted conductor in first position and being adapted to release said pivoted conductor when it is moved from normal position by impact on the ring in front of it, and a spring engaging said pivoted conductor and biasing it toward contact with the third terminal.

3. A target as claimed in claim 2 comprising additional conductors leading from separate electrical paths within the recording device to said second terminals associated with each switch of all but the outermost ring, an additional conductor leading from a separate electrical path within the recording device to the third terminal of each switch associated with the innermost ring, and conductors connecting the first terminal of each switch associated with all except the outermost ring to the third terminal of one switch associated with the outer of the adjacent rings, only one switch associated with any one ring being connected to any one switch in an adjacent ring.

RAYMOND T. KIMMEL.
JAMES A. WOODSON.

REFERENCES CITED

The following references are of record in the file of this patent:

UNITED STATES PATENTS

| Number | Name | Date |
| --- | --- | --- |
| 1,460,860 | Michoud | July 3, 1923 |
| 2,039,552 | Reynolds | May 5, 1936 |
| 2,152,803 | Hawkins | Apr. 4, 1939 |
| 2,241,135 | Jaimet et al. | May 6, 1941 |
| 2,298,208 | Gilbert et al. | Oct. 6, 1942 |
| 2,379,704 | Goff | July 3, 1945 |

FOREIGN PATENTS

| Number | Country | Date |
| --- | --- | --- |
| 530,911 | Great Britain | Dec. 24, 1940 |